J. C. GEBHART.
MACHINE FOR MEASURING TEXTILE FABRIC.
APPLICATION FILED SEPT. 4, 1917.

1,280,012.

Patented Sept. 24, 1918.
5 SHEETS—SHEET 1.

J. C. GEBHART.
MACHINE FOR MEASURING TEXTILE FABRIC.
APPLICATION FILED SEPT. 4, 1917.

1,280,012.

Patented Sept. 24, 1918.
5 SHEETS—SHEET 4.

Witnesses

Inventor:
John C. Gebhart,
by James L. Norris, Attorney.

J. C. GEBHART.
MACHINE FOR MEASURING TEXTILE FABRIC.
APPLICATION FILED SEPT. 4, 1917.

1,280,012.

Patented Sept. 24, 1918.
5 SHEETS—SHEET 5.

Witnesses

Inventor:
John C. Gebhart,
by James L. Norris, Attorney

UNITED STATES PATENT OFFICE.

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

MACHINE FOR MEASURING TEXTILE FABRIC.

1,280,012.  Specification of Letters Patent.  Patented Sept. 24, 1918.

Application filed September 4, 1917. Serial No. 189,599.

*To all whom it may concern:*

Be it known that I, JOHN C. GEBHART, a citizen of the United States, residing at St. Louis, city and State of Missouri, have invented new and useful Improvements in Machines for Measuring Textile Fabric, of which the following is a specification.

This invention relates to improvements in machines for measuring textile fabric and proposes a measured length indicating mechanism which is especially applicable as an appurtenance of a machine having a progressively operated price computing chart, such as is disclosed in my Letters Patent No. 1,252,258, granted January 1, 1918. The said price computing chart may, and preferably does, have combined therewith, as disclosed in my said pending application, a length indicating scale and the mechanism of the present invention may be employed in addition to, or in substitution for, said scale.

The principal object of the invention is a mechanism adaptable to a machine of the type referred to which shall conspicuously and clearly exhibit an indication of the measured length in terms of inches, and, preferably, also of yards, which shall have its readings located squarely under the eyes of the operator and shall in no way interfere with the reading of the price computing chart, and which shall be simple and compact in construction so as not to substantially increase the size of the machine, and positive and reliable in its operation.

A further object of the invention is to provide for the correlation of the zero-setting devices of the indicating mechanism and the price computing chart whereby said mechanism and said chart may be automatically zero-set by the actuation of a single controlling part.

With the above objects in view the invention consists in certain novel features of structure, combination and relation which will be set forth in detail as the description proceeds.

An embodiment of the invention is illustrated in the accompanying drawings, wherein:—

Similar characters of reference designate corresponding parts throughout the several views.

Figure 2:
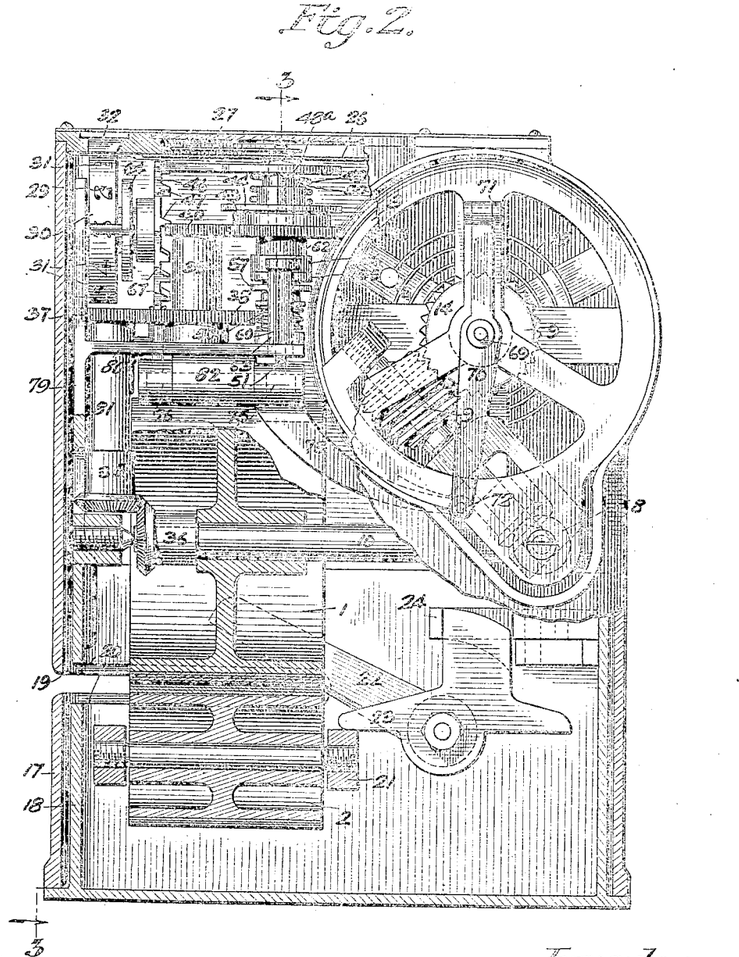
Fig. 2 is a view showing the casing and rollers of the measuring machine in vertical longitudinal section and showing the mechanism of the present invention in side elevation.
Figure 3:
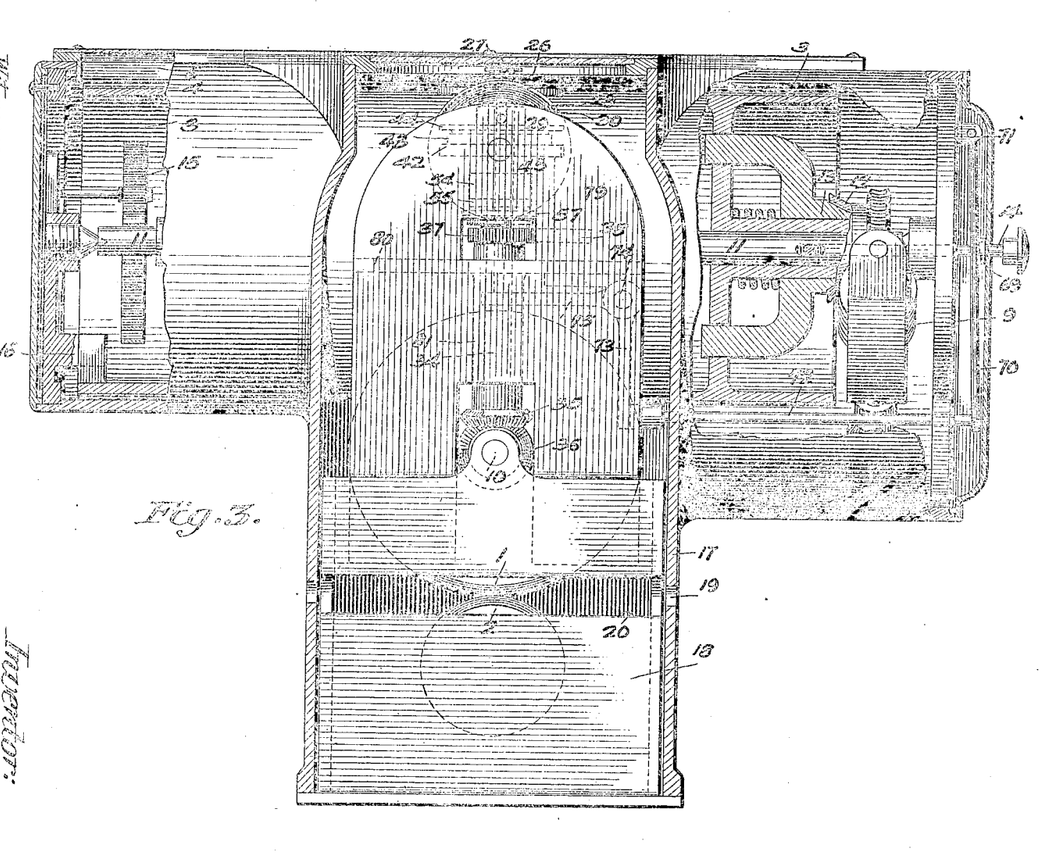
Fig. 3 is a cross sectional view on the line 3—3 of Fig. 2; this figure also shows the part of the casing which incloses the price computing chart as broken away at the ends to illustrate certain elements employed in the zero-setting operation.

The invention is shown in its application to a machine of the general construction disclosed in my said Patent No. 1,252,258 and which includes upper and lower rollers 1 and 2, the upper roller being a power roller, a drum 3 which carries the price computing chart 4, the latter co-acting with a stationary price scale 5 mounted adjacent the slot 6 through which the readings of the chart are exposed, gearing 7—8—9 between the shaft 10 of the roller 1 and the shaft 11 of the drum 3 for operating the latter, a clutch 12—13 for controlling the operation of the drum 3, a stem 14 which is operated manually to disengage the clutch elements 12—13, a spring 15 for returning the drum to initial position when the clutch elements are held disengaged, thereby zero-setting the price computing chart, and a stop lug 16 Fig. 3 for limiting the return movement of the drum by the spring 15. The operating parts are arranged in a casing 17 and the rollers 1 and 2 are supported by a frame 18; said casing and frame having registering slots 19—20, through which the edge portion of the fabric is inserted or removed from between the rollers 1 and 2. To facilitate such insertion or removal of the fabric the lower roller 2 is mounted in a depressible carrier 21. When the measurement has been completed the fabric is slit to furnish an indication of the line along which the measured length is to be cut or torn by a blade 22 (Fig. 2); and the carrier 21 is lowered to space the roller 2 from the roller 1, thereby to permit the removal of the goods, by the operation of an arm 23. The blade 22 and arm 23 may be of any suitable construction but as shown and preferred are of the construction disclosed in my co-pending application, Serial No. 185,968 wherein an element 24 is employed to prevent a simultaneous operation of said blade and arm.

Figure 1:
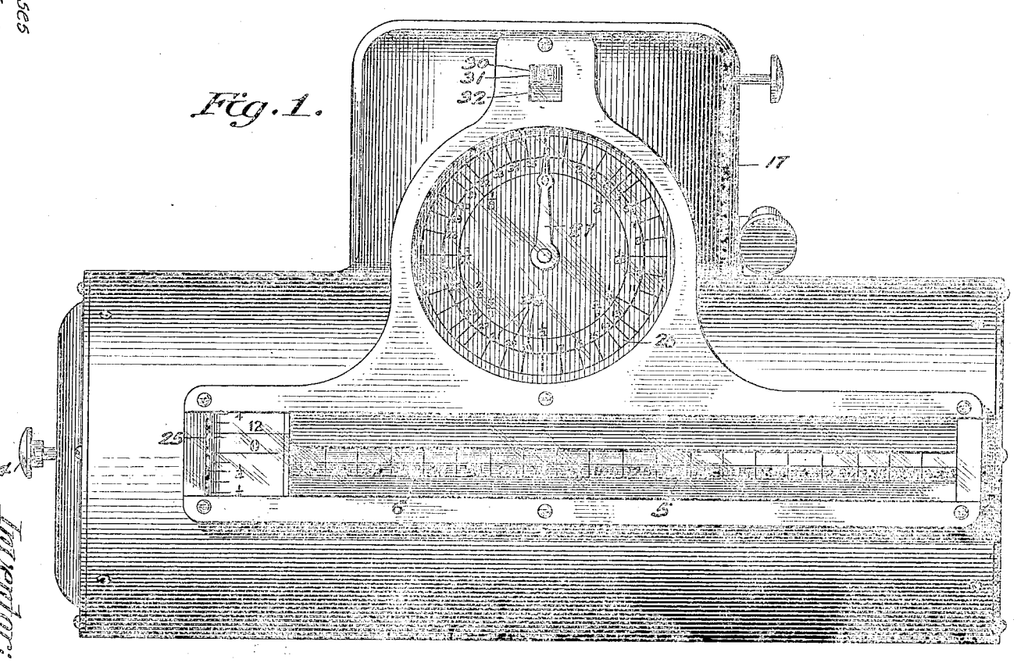
Figure 1 is a plan view of a textile fabric measuring and price computing machine to which the present invention is applied.

In the machine shown in my said Patent No. 1,252,258 the price computing chart has combined therewith a length indicating scale; and the length indicating mechanism of the present invention may be employed in substitution for or in addition to said scale. It is preferred, however, to retain the said scale and the same is shown at 25 (Fig. 1). The length indicating scale as retained in connection with the length indicating mechanism is chiefly of advantage in furnishing an ever present check on the accuracy of said mechanism.

The length indicating mechanism of the present invention includes a dial 26 having a capacity of a yard and graduated into inches, and eighths, quarters, thirds and halves of a yard and a pointer 27 operating over said dial. Without substantially increasing the size of the machine it is practical to make the dial of relatively large area, as shown, whereby its calibrations although equal in value to those of the scale 25 will be much larger and more widely separated. In this way the dial may be read with greater facility and certainty than said scale, the area of the dial enabling the smallest units of measurement, i. e. inches to be prominently and clearly displayed and separately identified by numerals 28 corresponding to the progression of measurement.

If desired the scale 25 can be relied upon to indicate full yards whereby the total measurement will be the sum of the readings in yards on said scale and in inches on the dial 26, as determined by the position of the pointer. It is preferred, however, to provide a yard indicator whose reading will be displayed in adjacency to the dial 26; and the said indicator conveniently consists of a wheel 29 having a marginal flange 30 which bears numerals 31 indicative of yards.

In the preferred construction the dial 26 is arranged centrally of the machine, immediately in front of and close to the chart 4 and vertically over the roller 1, and the wheel 29 is arranged immediately in front of and close to the dial 26, the numerals 31 being exposed through an opening 32. As thus arranged the numerals 28 and 31 will be squarely under the eyes of the operator and all of the readings of the machine, including those of the chart 4 and scale 25 will be displayed within a limited area well within the field of vision as the operator bends over the machine.

Figure 4:
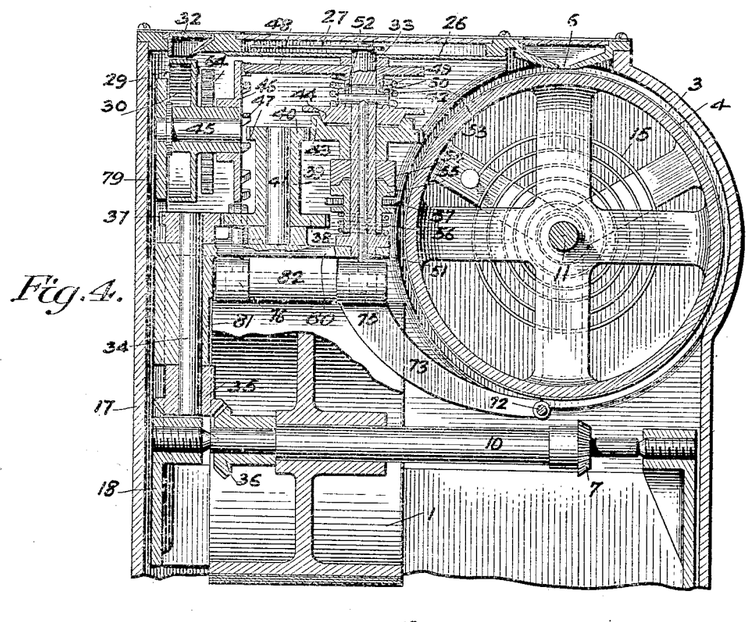
Fig. 4 is a central vertical sectional view of the machine.
Figure 5:
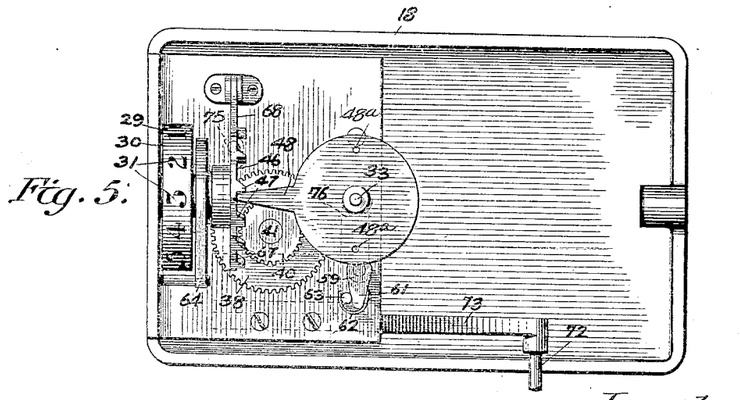
Fig. 5 is a detail plan view of the length indicating mechanism.

The pointer 27 is mounted on a vertical shaft 33 (Fig. 4) whose upper end projects centrally through the dial 26; and the shaft 33 is driven by gearing from the shaft 10 of the roller 1 and in turn operates the yard indicator wheel 29. The gearing for operating the shaft 33 includes a vertical shaft 34 having at its lower end a bevel pinion 35 in mesh with a similar pinion 36 on the front end of the shaft 10 and having at its upper end a spur pinion 37; a pinion 38 driven by the pinion 37 and mounted fast on a sleeve 39 which at its upper end is provided with a pinion 40, said sleeve having a bearing on an upright post 41; a pinion 42 loosely mounted on the shaft 33 and in mesh with the pinion 40; and a clutch having an element 43 formed with the pinion 42 and an element 44 which rotates the shaft 33 and is slidable lengthwise thereof.

The yard indicator wheel 29 is mounted on a horizontal post 45 and its hub is provided with a disk 46, having equi-distantly arranged projections 47 corresponding in number to the yards for which the machine has capacity. Just below the dial 26 the shaft 33 is provided with a horizontal arm 48 whch co-acts with the projections 47 to effect a step-by-step rotation of the disk 46 and wheel 29 operated by said disk. During each revolution of the shaft 33 the arm 48 will effect a movement of the wheel 29 and in this way, upon the measurement of each yard, a numeral 31 indicative of the total number of yards measured will be displayed through the opening 32.

Figure 7:
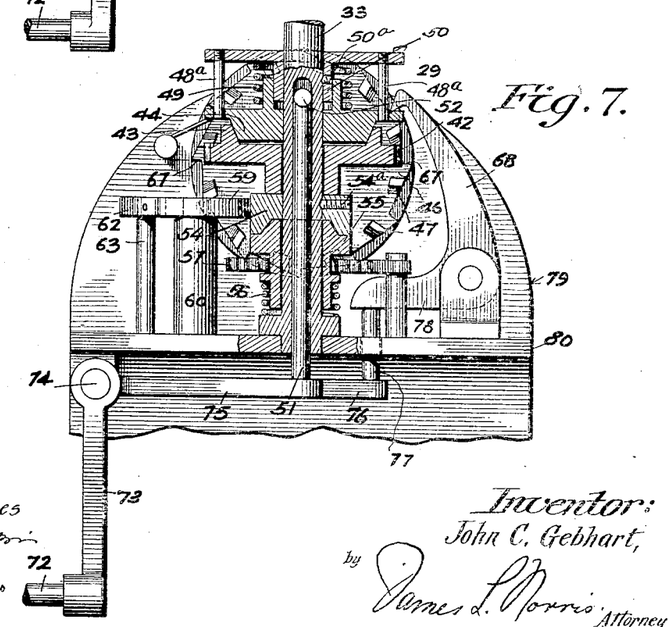
Fig. 7 is a cross sectional view in the plane 7—7 of Fig. 5, showing details of the length indicating mechanism.

The clutch element 44 is normally held in engagement with the element 43 by a spring 49 surrounding a sleeve 50 held fast upon the shaft 33 in any suitably manner, for example by retaining screw 50ª (Fig. 7), and upon which the arm 48 is mounted, said spring being confined between said arm and the clutch element 44. The shaft 33 has a central bore extending from its lower end in which is arranged a slidable stem 51 bearing at its upper end against a cross pin 52. The pin 52 has its ends secured in the hub of the clutch element 44 and operates in alining slots 53 (Fig. 4) in the sleeve 50 and shaft 33. When the stem 51 is raised or moved inward it will raise the clutch element 44, effecting its disengagement from the element 43, as is obvious.

The pin 52 serves to connect the element 44 and shaft 33 whereby said element will rotate with said shaft. This purpose may also be served by suitable connections between the hub of the arm 48 and the element 44. Thus said hub may, as shown in Fig. 1, be provided with depending pins 48ª, which have a sliding fit in openings provided therefor in the element 44.

The pointer 27 and wheel 29 are zero-set during the interval in which the clutch elements 43—44 are disengaged.

Figure 6:
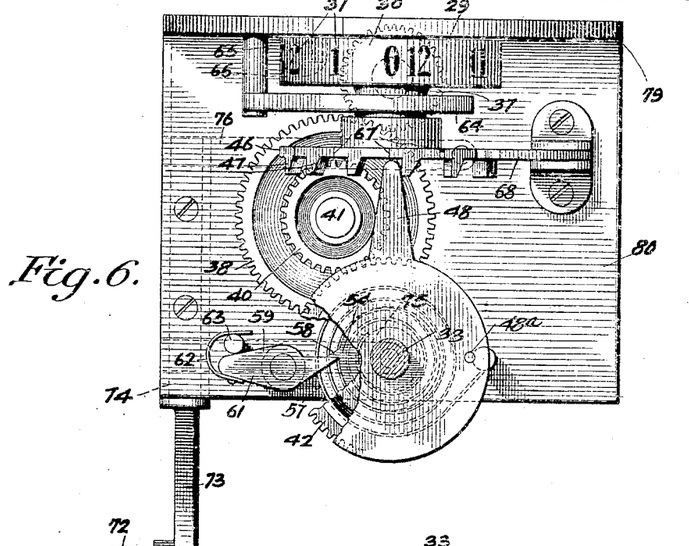
Fig. 6 is a view similar to Fig. 5 but on an enlarged scale and with the parts at zero, certain elements being partly broken away.

For the purpose of zero-setting the pointer the shaft 33 has thereon, below the pinion 42, a friction clutch element 54 which is held fast to said shaft in any suitable manner, for example by a retaining screw 54ª (Fig. 7), and is in constant engagement with a companion element 55, loose on said shaft, the engagement of the clutch elements 54-55 being established by a spring 56; and the clutch element 55 is acted upon by a coil re-setting spring 57. When the shaft 33 is driven by the pinion 42 and clutch 43-44 the clutch element 55 rotates with its companion element 54 only so long as the tension of the spring 57 permits and during such rotation stores power in said spring whereby the latter is effective, in all cases, to zero-set the pointer 27. During any further rotation of the clutch element 54, the element 55 will, by virtue of the tensioning of the spring 57, remain substantially stationary, slipping relatively to its companion element 54. The element 54 is provided with a single outwardly projecting tooth 58 (Fig. 6) which has a beveled side and coöperates with a pawl 59. The pawl 59 is pivotally mounted upon a fixed upright post 60 (Fig. 7) and has a tail-piece 61 which is normally held by a spring 62 against an abutment lug 63. In the normal operation of the machine the element 54 has clockwise rotation and at a period of each revolution its tooth 58 will displace and move past the pawl 59, the spring 62 restoring said pawl to its normal position as determined by the engagement of the tail piece 61 with the lug 63. When the clutch elements 43—44 are disengaged the shaft 33 is operated by the spring 57 and clutch 54-55 to zero-set the pointer 27. In such operation the clutch element 54 has counter-clockwise rotation, and its tooth 58 co-acts with the pawl 59 as a rigid stop to arrest the rotation of the shaft 33 when the pointer 27 reaches its zero position. It will be obvious that regardless of the number of revolutions which the pointer 27 may have made in the normal operation of the machine, its zero-setting movement will be within the limits of substantially a single revolution.

It is to be noted that if the pointer 27 be in zero-position upon the completion of the normal operation of the machine the tooth 58 of the clutch element 54 will have displaced but will not have moved past the pawl 59 and consequently when the zero-setting mechanism is actuated the pointer 27, notwithstanding its zero position will be moved a full revolution in counter-clockwise rotation, during which movement the pawl 59 resumes its normal position and is effective, as described, to arrest the movement of the shaft 33 when the pointer 27 again reaches zero position. The movement of the pointer as described provides an interval in which the arm 48 is out of the path of the projections 47 in order that the zero-setting movement of the wheel 29, (in which movement the disk 46 participates) may be effected by the means provided therefor and to be hereafter described. It is to be further noted that at the moment when the tooth 58, in the normal operation of the machine, passes beyond and releases the pawl 59, the arm 48 will be located beyond the projections 47 and in a position wherein it will present no obstacle to the return movement of the disk 46 in participation with the zero-setting movement of the wheel 29. In any case, therefore, the arm 48 will in no way interfere with the zero-setting of the wheel 29.

The zero-setting movement of the wheel 29 is effected by a coil spring 64 connected to the hub which extends between the wheel 29 and disk 46 and is limited by a fixed stop lug 65 (Fig. 6) co-acting with a lug 66 on said wheel. The spring 64 is tensioned as the disk 46 is operated by the arm 48; and in order to prevent retrograde movement, said disk is formed with marginal ratchet teeth 67, which coincide in number and arrangement with the projections 47 and are engaged by a pawl 68. When the pawl 68 is held beyond the path of the ratchet teeth 67, the spring 64 is effective to zero-set the wheel 29.

The zero-setting of the pointer 27 and wheel 29 as above described is controlled by the stem 14 (Fig 3). Said stem is provided with a collar 69 which engages a lever 70, pendent from a pivotal support 71. The lever 70 is connected by a horizontal link 72 to an arm 73 which projects downward from a horizontal rock shaft 74. The shaft 74 is provided with a horizontal arm 75 upon which the stem 51 (Fig. 7) rests and with another horizontal arm 76 having at its free end an upright post 77 which engages an angular extension 78 of the pawl 68. When the stem 14 is pushed inward to provide for the zero-setting of the chart 4 its collar 69 moves the lever 70 which in turn operates the arm 73 to move the rock shaft 74 and raise the arms 75 and 76. The arm 75, through the stem 51 effects the disengagement of the clutch elements 43—44 and the arm 76 moves the pawl 68 beyond the ratchet teeth 67. Both of the springs 57 and 64 are thereby simultaneously effective for the zero-setting of the pointer 27 and wheel 29. The spring 64 is considerably stronger than the spring 57 whereby the zero-setting movement of the wheel 29 is more rapid than that of the pointer 27 and, in any case, will be completed before the arm 48 reaches its normal position.

The dial 26 is supported by the top wall of the casing 17. The other elements of the length indicating mechanism are supported by a bracket 79 (Fig. 2) which rests upon the frame 18 and has a shelf 80 projecting over the roller 1. The bracket 79 is provided with a supporting bearing 81 (Figs. 2 and 4) for the shaft 34 and also carries the post 45 which supports the wheel 29. The shelf 80 provides a bearing for the shaft 33 and carries the post 41 upon which is mounted the sleeve 39 and a supporting sleeve 82 for the rock shaft 74.

The operation will be readily apparent from the foregoing description. The fabric to be measured is drawn between the rollers 1 and 2 and the roller 1, functioning as a power roller, acts through the gear 7, 8, 9 to effect the rotation of the drum 3 which carries the price-computing chart 4 and said roller also acts (through the gears 35, 36, shaft 34, gears 37, 38, 40 and 42, and clutch 43—44) to effect the rotation of the shaft 33. the latter directly operating the pointer 27 and, through the arm 48 and disk 46, also operating the wheel 29. The pointer 27 and wheel 29 furnish a continuous indication of measured length which is synchronous with the indication of total price, based on price per yard, furnished by the chart 4. When the measuring operation has been completed the roller 2 is spaced from the roller 1 by the operation of the arm 23 to permit the fabric to be withdrawn from between said rollers and thereupon the stem 14 is pushed inward to provide for the zero-setting of the chart 4, pointer 27 and wheel 29 by the respective devices which have been described in detail. Upon fabric being introduced between the rollers 1 and 2 and the roller 2 moved to its elevated position the machine is ready for another operation in which the procedure above described is repeated.

Having fully described my invention I claim:—

1. A machine for measuring textile fabric having a power roller, a horizontal shaft on which the power roller is mounted, a dial located vertically over the power roller, a pointer operating over said dial, an upright shaft carrying said pointer, a second upright shaft located at one end of said power roller and geared to the shaft thereof and gearing located vertically over said power roller between and connecting said second upright shaft and said pointer carrying shaft, said pointer in coöperation with dial giving a continuous indication of measurement.

2. A machine for measuring textile fabric having a power roller, a shaft on which the power roller is mounted, a dial located above the power roller, a pointer operating over said dial, a shaft carrying said pointer, gearing for operating said pointer carrying shaft from the shaft of said power roller including a clutch, means for disengaging the elements of said clutch and means for automatically operating said pointer carrying shaft to zero-set said pointer upon the disengagement of the elements of said clutch, said pointer in coöperation with said dial giving a continuous indication of measurement.

3. A machine for measuring textile fabric having a power roller, a shaft on which the power roller is mounted, a dial, a pointer operating over said dial and giving a continuous indication of measurement, a shaft carrying said pointer, gearing for operating said pointer carrying shaft from the shaft of said power roller including a clutch, means for disengaging the elements of said clutch, a second clutch having permanently engaged elements fast and loose with said pointer carrying shaft, a fixed stop for limiting the rotation of the loose element of said second clutch to a single revolution whereby said loose element will slip relatively to its companion element and a spring acting on the loose element of said second clutch to operate said pointer carrying shaft in zero-setting said pointer when the elements of said first named clutch are disengaged.

4. A machine for measuring textile fabric having a power roller, a shaft on which the power roller is mounted, price computing means including as companion co-acting elements a chart and a price scale, said elements being relatively movable, gearing between the movable element and one end of said shaft, a dial located in adjacency to said chart and vertically over said power roller, a pointer operating over said dial and giving a continuous indication of measurement, a shaft carrying said pointer and gearing also located vertically over said power roller and between the other end of said power roller shaft and said pointer carrying shaft.

5. A machine for measuring textile fabric having a power roller, a shaft on which the power roller is mounted, price computing means including as companion co-acting elements a chart and a price scale, said elements being relatively movable, gearing for driving the movable element from the shaft of said power roller, length indicating means including a dial arranged in adjacency to said chart and a pointer operating over said dial, a shaft carrying said pointer, gearing for operating said pointer carrying shaft from the shaft of said power roller, means for zero-setting said price computing means, means for zero-setting said length indicating means and a common controlling element for both of said zero-setting means.

6. A machine for measuring textile fabric having a power roller and length indicating mechanism including a dial and a pointer operating over said dial and revoluble through such a number of revolutions as may be within the measuring capacity of the machine, gearing for operating said pointer from the power roller and including a clutch, means for disconnecting the elements of said clutch, and means operating automatically upon the disconnection of said clutch elements for effecting a zero-setting movement of the pointer within the compass of a single revolution thereof.

7. A machine for measuring textile fabric having a power roller, a shaft on which the power roller is mounted, and length indicating mechanism including a dial having a capacity of a yard, a pointer operating over said dial, a shaft carrying said pointer, a wheel calibrated in yards, means for operating the wheel from the pointer-carrying shaft, pawl and ratchet means for holding the wheel against retrograde movement, gearing for operating the pointer-carrying shaft from said power roller and including a clutch, means for disconnecting the elements of said clutch and for simultaneously disconnecting the elements of said pawl and ratchet means, means operating automatically upon the disconnection of said clutch element for effecting a zero-setting movement of the pointer within the compass of a single revolution thereof, and means for zero-setting the wheel during the zero-setting of the pointer.

8. A machine for measuring textile fabric having a power roller, length indicating mechanism including a dial, a pointer operating over said dial, and a shaft carrying said pointer, gearing between said power roller and said shaft including a clutch, a zero-setting spring, a second clutch to transmit the action of said spring to said shaft and having an element fast on said shaft and formed with a projection, and a pawl with which said projection coöperates.

9. A machine for measuring textile fabric having a power roller, a shaft on which the power roller is mounted, and length indicating mechanism including a dial having a capacity of a yard, a pointer operating over said dial, a shaft carrying said pointer, a wheel calibrated in yards, means for operating the wheel from the pointer-carrying shaft, pawl and ratchet means for holding the wheel against retrograde movement, gearing for operating the pointer-carrying shaft from the shaft of said power roller and including a clutch, means for disconnecting the elements of said clutch, means for disconnecting the elements of said pawl and ratchet means and a single actuating device common to said disconnecting means for effecting their operations simultaneously.

10. A machine for measuring textile fabric having a power roller, a shaft on which the power roller is mounted and length indicating mechanism including means for indicating fractions of a yard, adjacent means for indicating yards, both means having movable elements, gearing operated by said power roller for operating said movable elements, devices for holding said movable elements against retrograde movement, means having a single actuating element for operating said devices to simultaneously release said movable elements, and means for automatically zero-setting said movable elements upon the operation of said devices to release them.

11. A machine for measuring textile fabric having a power roller, a shaft on which the power roller is mounted, price computing means located adjacent the rear end of said power roller and above said shaft, length indicating means located in front of and in adjacency to said price computing means and vertically over said power roller, gearing for operating the price computing means and driven from the rear end of said shaft and other gearing for operating the length indicating means and driven from the front end of said shaft.

12. A machine for measuring textile fabric having a power roller, a shaft on which the power roller is mounted, price computing means located adjacent the rear end of said power roller and above said shaft, length indicating means located in front of and in adjacency to said price computing means and above said power roller, gearing for operating the price computing means and driven from the rear end of said shaft, other gearing for operating the length indicating means and driven from the front end of said shaft, both gearings including devices for holding the movable elements of said respective means against retrograde movement and said devices being operable to permit of retrograde movement of said elements, means having a single actuating element for operating said devices to simultaneously release said movable elements, and means for automatically zero-setting said movable elements upon the operation of said devices to release them.

13. A machine for measuring textile fabrics having a price computing means, length indicating means located in front of and in adjacency to said price computing means, a shaft located under said length indicating means and geared at its rear end to said price computing means and at its front end to said length indicating means and a power roller over which the fabric is drawn mounted on said shaft intermediate the gearings at the respective ends thereof.

14. A machine for measuring textile fabric having price computing means, length indicating means located in front of and in adjacency to said price computing means, a shaft located under said length indicating means and geared at its rear end to said price computing means and at its front end to said length indicating means, a power roller over which the fabric is drawn mounted on said shaft intermediate the gearings at the respective ends thereof, devices for automatically zero-setting the movable elements of said price computing and length indicating means and controlling means for said zero-setting devices, said controlling means having a single actuating element and being susceptible of a single operation, to provide for the operations of said zero-setting devices.

In testimony whereof I have hereunto set my hand in presence of two subscribing witnesses.

JOHN C. GEBHART.

Witnesses:
 FRED UHLEMEYER,
 C. SUMNER.

Copies of this patent may be obtained for five cents each, by addressing the "Commissioner of Patents, Washington, D. C."